United States Patent
Khandelwal et al.

(10) Patent No.: US 10,019,472 B2
(45) Date of Patent: Jul. 10, 2018

(54) SYSTEM AND METHOD FOR QUERYING A DISTRIBUTED DWARF CUBE

(71) Applicant: Intellicus Technologies Pvt. Ltd., Madhya Pradesh (IN)

(72) Inventors: Ankit Khandelwal, Madhya Pradesh (IN); Kapil Ghodawat, Madhya Pradesh (IN); Sajal Rastogi, Madhya Pradesh (IN); Saurabh Gupta, Madhya Pradesh (IN)

(73) Assignee: INTELLICUS TECHNOLOGIES PVT. LTD. (IN)

( * ) Notice: Subject to any disclaimer, the term of this patent is extended or adjusted under 35 U.S.C. 154(b) by 805 days.

(21) Appl. No.: 14/459,803

(22) Filed: Aug. 14, 2014

(65) Prior Publication Data

US 2016/0048560 A1 Feb. 18, 2016

(51) Int. Cl.
*G06F 17/30* (2006.01)
(52) U.S. Cl.
CPC .. *G06F 17/30333* (2013.01); *G06F 17/30592* (2013.01)
(58) Field of Classification Search
None
See application file for complete search history.

(56) References Cited

U.S. PATENT DOCUMENTS

| | | | |
|---|---|---|---|
| 7,761,407 B1 * | 7/2010 | Stern | G06F 17/30324 707/602 |
| 8,380,748 B2 | 2/2013 | Berger et al. | |
| 8,738,650 B2 * | 5/2014 | Bawa | G06F 17/30592 707/770 |
| 2003/0126143 A1 * | 7/2003 | Roussopoulos | G06F 17/30592 |

(Continued)

FOREIGN PATENT DOCUMENTS

| | | |
|---|---|---|
| CN | 101183368 | 5/2008 |
| CN | 102508913 | 6/2012 |
| CN | 102982103 | 3/2013 |
| WO | WO2013175308 A1 | 11/2013 |

OTHER PUBLICATIONS

Juan Zhang, "Building Quotient Cube with MapReduce in Hadoop", Proceedings of the 2nd International Symposium on Computer, Communication, Control and Automation (ISCCCA-13), Sep. 2013 Wang Zhengkui.

(Continued)

*Primary Examiner* — Christopher J Raab
(74) *Attorney, Agent, or Firm* — Hayes Soloway P.C.

(57) ABSTRACT

Systems and methods for querying a distributed dwarf cube are disclosed. A query for retrieving data from a distributed dwarf cube is received. The distributed dwarf cube is built of the data. The data comprises cube values. The distributed dwarf cube is built by processing the data to generate indexes for the data. The cube values in one or more dimensions are sorted based on a cardinality of the cube values. The data is partitioned into data blocks to build distributed dwarf cube from each data block based upon the cardinality of the cube values. The distributed dwarf cube comprises one or more ranges defined for the cube values. The one or more ranges of the cube values are checked based upon the query. Using the cube values, a list is created. The list of the cube values is transmitted from the distributed dwarf cube corresponding to the query.

17 Claims, 8 Drawing Sheets

(56) References Cited

U.S. PATENT DOCUMENTS

| | | | | |
|---|---|---|---|---|
| 2013/0013552 A1* | 1/2013 | Eshleman | ............... | G06Q 10/00 707/600 |
| 2014/0279838 A1* | 9/2014 | Tsirogiannis | ..... | G06F 17/30292 707/603 |
| 2014/0337274 A1* | 11/2014 | Unnikrishnan | ........ | G06N 5/047 706/48 |
| 2015/0106325 A1* | 4/2015 | Cole | ................. | G06F 17/30592 707/600 |

OTHER PUBLICATIONS

Wang Zhengkui , "Scalable Data Analysis on Mapreduce-Based Systems" 2013.

P Jan , "Modelisation Et Ex 'Ecution Des Applications D'analyse De Donnees Mulitidimentionnelles Sur' Architectures Distribuees" Dec. 13, 2010.

Shi Jingang, Bao Yubin, Leng Fangling, and Yu Ge., "Efficient Parallel Dwarf Data Cube Using MapReduce" College of Information Science and Engineering, Northeastern University, Shenyang 110819, China, 2011.

Zhengkui Wang, Yan Chu, Kian-Lee Tan, Divyakant Agrawal, Amr Ei Abbadi, Xiaolong Xu, " Scalable Data Cube Analysis over Big Data", Nov. 22, 2013.

Yannis Sismanis and Nick Roussopoulos , "The Dwarf Data Cube Eliminates the High Dimensionality Curse" 2003.

Bo Wang, Hao Gui, Mark Roantree and Martin F. O'Connor, "Data Cube Computational Model with Hadoop MapReduce" Apr. 3, 2014.

* cited by examiner

SYSTEM AND METHOD FOR QUERYING A DISTRIBUTED DWARF CUBE

FIELD OF INVENTION

The present disclosure relates to a field of querying a distributed dwarf cube. More particularly, the present disclosure relates to a system and method for querying a distributed dwarf cube that is built using a mapreduce technique.

BACKGROUND

With advent in technology, organizations are increasingly capturing and storing machine generated data resulting in generation of extremely large amounts of the data. The data generated comprises server logs or records of user interaction with websites, sales transaction data, product information, etc. In order to effectively organize the data, the organizations utilize On-Line Analytical Processing (OLAP) systems. Generally, OLAP systems facilitate and manage analytical applications built by aggregating transactional data. OLAP systems may be built on a variety of transactions such a database management system transactions, business, or commercial transactions.

The OLAP systems enable users to analyze multidimensional data. Generally, analysis on the multidimensional data may include one or more operations such as aggregating the data, slice and dice and drill-down. The slice and dice operation comprises taking specific sets of data and viewing the data from multiple viewpoints. Basis for the OLAP system is an OLAP cube. The OLAP cube is a data structure allowing for fast analysis of the data with capability of analyzing the data from multiple perspectives. Typically, the OLAP cubes are composed of numeric facts, called measures, and are categorized by dimensions. The measures are derived from fact tables, which are typically composed of the measurements or data of a business process, e.g. number of products sold in a store. The dimensions are derived from dimension tables. In other words, a measure has a set of labels, where the description of the labels is described in corresponding dimension.

The OLAP systems typically categorized as either a Relational Online Analytical Processing (ROLAP) or in a Multidimensional Online Analytical Processing (MOLAP). In ROLAP, the data is stored in relational databases. As known, a response time for processing a query in ROLAP may be unpredictable. Generally, SQL statements are generated to query the relational databases used as ROLAP Data warehouse. The response time can be long if size of the data is large.

On the other hand, in MOLAP, the data is stored in multidimensional cubes. In MOLAP, the data is pre-computed and the data is stored in an OLAP cube. The MOLAP system may store the data as an in-memory multidimensional data structure, rather than in a relational database. The pre-processing and storage of the data allows for fast query performance due to optimized storage, multidimensional indexing and caching of the data. As the data is stored in OLAP cubes, the data may be retrieved with a predictable response time and much faster than in ROLAP.

As the data is pre-aggregated in MOLAP, retrieval of the data may be significantly faster. However, when the data is aggregated, if more selections are made for the dimensions to be retrieved, the flexibility in viewing the data may not be effective. Further, as the OLAP cubes comprise the data in multiple dimensions, it may be difficult to browse the data in the OLAP cubes. Further, multiple dimensions may lead to explosion of the data. This is because the amount of the data grows exponentially as the number of dimensions increase.

SUMMARY

This summary is provided to introduce concepts related to systems and methods for querying a distributed dwarf cube and the concepts are further described below in the detailed description. This summary is not intended to identify essential features of the claimed subject matter nor is it intended for use in determining or limiting the scope of the claimed subject matter.

In one implementation, a method for querying a distributed dwarf cube is disclosed. The method comprises receiving a query for retrieving data from a distributed dwarf cube. The distributed dwarf cube is built of the data. The data comprises cube values. The distributed dwarf cube is built by processing the data to generate indexes for the data. The cube values in one or more dimensions are sorted based on a cardinality of the cube values. The cube values are sorted in an order of highest cardinality to lowest cardinality. The cardinality indicates distinctiveness of the cube values in the one or more dimensions. The data is partitioned into data blocks to build distributed dwarf cube from each data block based upon the cardinality of the cube values. The distributed dwarf cube comprises one or more ranges defined for the cube values. The method further comprises checking the one or more ranges of the cube values based upon the query. The one or more ranges comprise complete cube values and non-complete cube values. The non-complete cube values indicate the cube values present at a start or an end of a range of the one or more ranges. The method further comprises creating a list of the cube values comprising the complete cube values and/or the non-complete cube values. The method further comprises transmitting the list of the cube values from the distributed dwarf cube corresponding to the query. The method further comprises replicating the distributed dwarf cube comprising dwarf cuboids on a plurality of query engines. The method further comprises querying the dwarf cuboids on the plurality of query engines in parallel.

In one implementation, a system for querying a distributed dwarf cube is disclosed. The system comprises a processor and a memory coupled to the processor. The processor executes program instructions stored in the memory. The processor executes the program instructions to receive a query for retrieving data from a distributed dwarf cube. The distributed dwarf cube is built of the data. The data comprises cube values. The distributed dwarf cube is built by processing the data to generate indexes for the data. The cube values in one or more dimensions are sorted based on a cardinality of the cube values. The cube values are sorted in an order of highest cardinality to lowest cardinality. The cardinality indicates distinctiveness of the cube values in the one or more dimensions. The data is partitioned into data blocks to build distributed dwarf cube from each data block based upon the cardinality of the cube values. The distributed dwarf cube comprises one or more ranges defined for the cube values. The processor further executes the program instructions to check the one or more ranges of the cube values based upon the query. The one or more ranges comprise complete cube values and non-complete cube values. The non-complete cube values indicate the cube values present at a start or an end of a range of the one or more ranges. The processor further executes the program instructions to create a list of the cube values comprising the complete cube values and/or the non-complete cube values. The processor further executes the program instructions to transmit the list of the cube values from the distributed dwarf cube corresponding to the query. The building further comprises replicating the distributed dwarf cube comprising dwarf cuboids on a plurality of query engines. The distributed dwarf cube comprising the dwarf cuboids are queried in parallel.

In one implementation, a non-transitory computer readable medium embodying a program executable in a computing device for querying a distributed dwarf cube is disclosed. The program comprising a program code for receiving a query for retrieving data from a distributed dwarf cube. The distributed dwarf cube is built of the data. The data comprises cube values. The distributed dwarf cube is built by processing the data to generate indexes for the data. The cube values in one or more dimensions are sorted based on a cardinality of the cube values. The cube values are sorted in an order of highest cardinality to lowest cardinality. The cardinality indicates distinctiveness of the cube values in the one or more dimensions. The data is partitioned into data blocks to build distributed dwarf cube from each data block based upon the cardinality of the cube values. The distributed dwarf cube comprises one or more ranges defined for the cube values. The program further comprises a program code for checking the one or more ranges of the cube values based upon the query. The one or more ranges comprise complete cube values and non-complete cube values. The non-complete cube values indicate the cube values present at a start or an end of a range of the one or more ranges. The program further comprises a program code for creating a list of the cube values comprising the complete cube values and/or the non-complete cube values. The program further comprises a program code for transmitting the list of the cube values from the distributed dwarf cube corresponding to the query.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to refer like/similar features and components.

DETAILED DESCRIPTION

Figure 1:
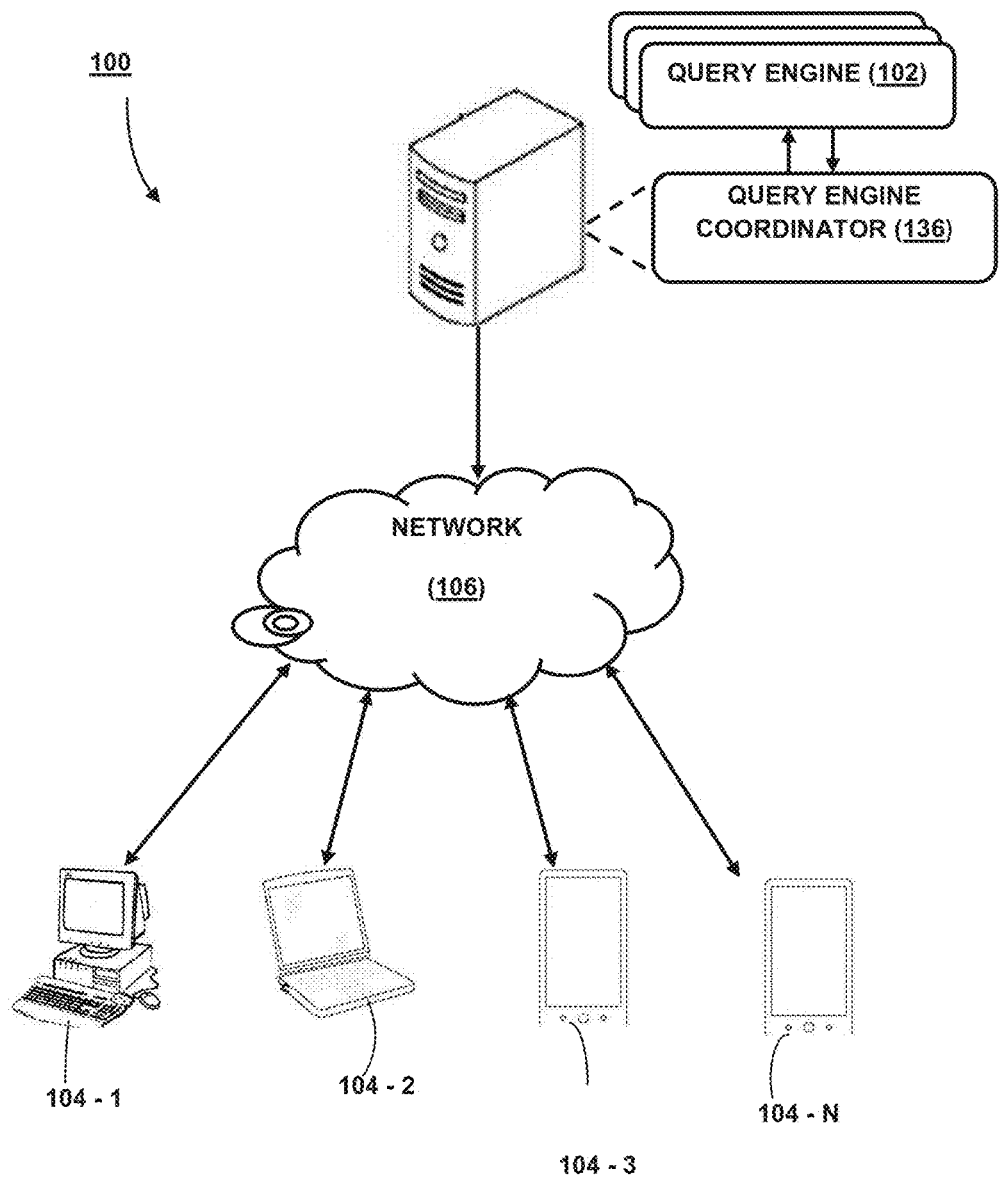
FIG. 1 illustrates a network implementation of a query engine for querying a distributed dwarf cube, in accordance with an embodiment of the present disclosure.

Systems and methods for querying a distributed dwarf cube are disclosed. The distributed dwarf cube comprises a plurality of dwarf cuboids. At first, a query may be received from a user to retrieve data from the distributed dwarf cube. The distributed dwarf cube may be built of the data. The data may comprise cube values. The distributed dwarf cube may be built by processing the data. The distributed dwarf cube may be built by launching a series of mapreduce jobs. The data may be given as an input for a first mapreduce job. After the first mapreduce job, an output of the first mapreduce job may be given as an input to a second mapreduce job. Similarly, for subsequent mapreduce jobs, an output generated by a previous mapreduce job may be provided as an input for a next mapreduce job. In the series of mapreduce jobs, first two mapreduce jobs process the data. The data is processed to generate indexes for the data.

Based on the indexes generated, the cube values in one or more dimensions may be sorted based on a cardinality of the cube values. The cube values are sorted in an order of highest cardinality to lowest cardinality. The cardinality indicates distinctiveness of the cube values in the one or more dimensions. Subsequently, the data is partitioned into data blocks. A dimension with highest cardinality is selected for partitioning the data. After partitioning the data, the mapreduce jobs are processed to build the distributed dwarf cube. A distributed dwarf cube is built for the dimension with highest cardinality. Further, the dimensions with highest cardinality may be eliminated. Upon emitting the data after eliminating the highest cardinality, the data may be sorted. For the remaining data, the dimension comprising second highest cardinality is selected for building the distributed dwarf cube. Similarly, the distributed dwarf cube is built for one or more data blocks based upon the order of the cardinality of the cube values. After the distributed dwarf cube is built, the distributed dwarf cube may comprise one or more ranges defined for the cube values.

After the distributed dwarf cube comprising the plurality of dwarf cuboids is built, for the query received, the one or more ranges defined for the cube values may be checked. The one or more ranges may comprise complete cube values and non-complete cube values. The non-complete cube values may indicate the cube values present at a start or an end of a range of the one or more ranges. Based on the query, a list of cube values comprising the complete cube values and/or the non-complete cube values may be created. Subsequently, the list of the cube values may be transmitted from the distributed dwarf cube corresponding to the query.

While aspects of described query engine and method for querying a distributed dwarf cube may be implemented in any number of different computing systems, environments, and/or configurations, the embodiments are described in the context of the following exemplary system.

Referring now to FIG. 1, a network implementation 100 of a query engine 102 for querying a distributed dwarf is illustrated, in accordance with an embodiment of the present disclosure. The query engine 102 may receive a query for retrieving data from a distributed dwarf cube. The distributed dwarf cube may be built of the data using a mapreduce technique. The data may comprise cube values. The building comprises processing the data to generate indexes for the data. The cube values in one or more dimensions may be sorted based on a cardinality of the cube values. The cube values may be sorted in an order of highest cardinality to lowest cardinality. The data may be partitioned into data blocks. A distributed dwarf cube is built for the dimension with highest cardinality. Further, the dimensions with highest cardinality may be eliminated. Upon emitting the data after eliminating the highest cardinality, the data may be sorted. For the remaining data, the distributed dwarf cube is built for one or more data blocks based upon the order of the cardinality of the cube values. After the distributed dwarf cube is built, the distributed dwarf cube may comprise one or more ranges defined for the cube values.

When the query is received at the query engine 102, the query engine 102 may check the one or more ranges defined for the cube values. The one or more ranges comprise complete cube values and non-complete cube values. Based on the query, the query engine 102 may create a list of cube values comprising the complete cube values and/or the non-complete cube values. Further, the query engine 102 may transmit the list of the cube values from the distributed dwarf cube corresponding to the query.

Although the present disclosure is explained by considering a scenario that the query engine 102 is implemented as an application on a server. It may be understood that the query engine 102 may also be implemented in a variety of computing systems, such as a laptop computer, a desktop computer, a notebook, a workstation, a mainframe computer, a server, a network server, and the like. It will be understood that the query engine 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the query engine 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
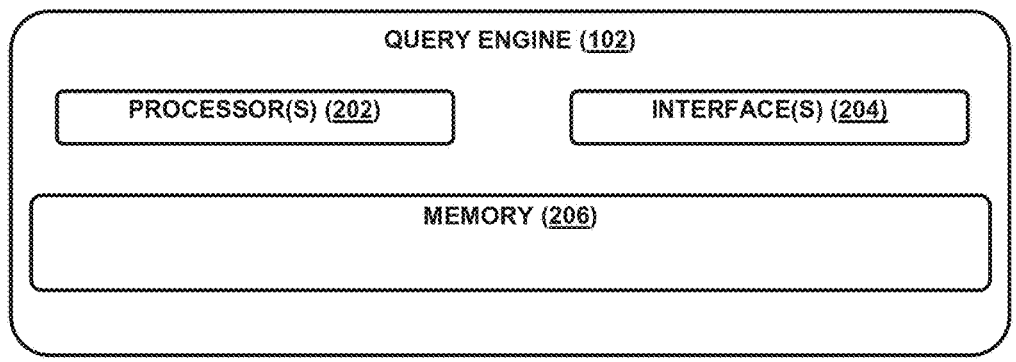
FIG. 2 illustrates the query engine, in accordance with an embodiment of the present disclosure.

Referring now to FIG. 2, the query engine 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, an Application Program Interface (API) and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, at first, a user may use the client device 104 to access the query engine 102 via the I/O interface 204. The working of the query engine 102 may be explained in detail using FIG. 2, FIG. 3, FIG. 4 and FIG. 5 explained below. The query engine 102 may be used for querying the distributed dwarf cube. The query engine 102 may comprise a plurality of nodes or machines. Example of nodes may include a computer, a server, or any other computing device.

Figure 3:
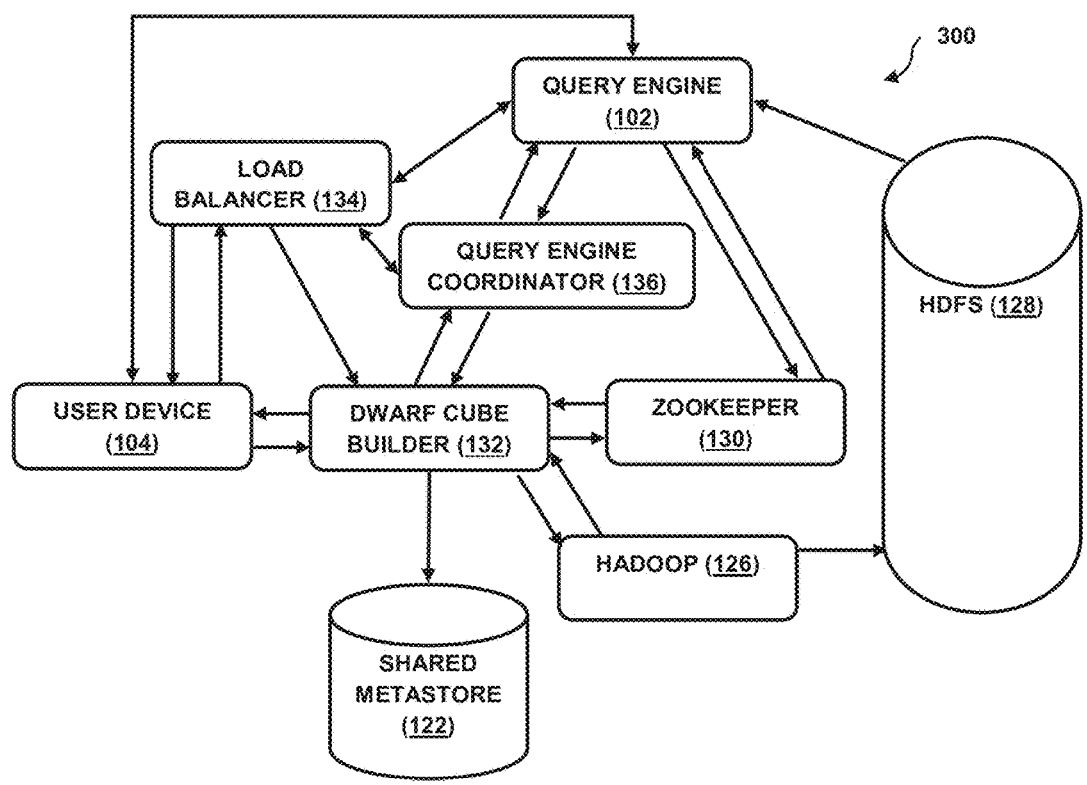
FIG. 3 illustrates architecture of the system comprising various components, in accordance with an embodiment of the present disclosure.

Referring now to FIG. 3, a system 300 used for querying the distributed dwarf cube is shown. As shown in the system 300, the query engine 102 may interact with a shared metastore 122, a Hadoop cluster 126, a Hadoop Distributed Files System (HDFS) 128, a zookeeper 130, a plurality of load balancers 134 and a query engine coordinator 136. The Hadoop cluster 126 may comprise a cluster of computers or nodes that works seamlessly in a distributed computing platform. Hadoop is a software library that allows for distributed processing of the data across the cluster of nodes. Hadoop is designed to scale from one to thousands of nodes, where each node is a computer responsible for its own processing and storage of the data. The functioning of components present in the system 300 is explained in detail in the following description.

The user may interact with the query engine 102 using a client application on the client device 104 to query the distributed dwarf cube. In one implementation, the user may interact with the query engine 102 using the client application on the client device 104 via the query engine coordinator 136 to query the distributed dwarf cube comprising dwarf cuboids.

At first, the user may query the query engine 102 to retrieve data from the distributed dwarf cube stored in the query engine 102. The data may comprise cube values. The distributed dwarf cube may be built using a mapreduce technique. The building of the distributed dwarf cube is explained below.

At first, the dwarf cube builder 132 may receive data comprising the cube values and a cube definition. The cube definition may comprise dimensions defined for the cube values. The dimension may indicate a structural attribute of the distributed dwarf cube that is a list of related names such as members, such that the dimensions belong to a similar category in the user's perception of the data. For example, months and quarters may indicate a time dimension. Similarly, cities, regions and countries may indicate a location dimension. The dimension may comprise a star schema or a single fact file. The star schema comprises one or more fact tables referencing number of dimension tables. A fact table may be a central table in the star schema of the data. The fact table may store quantitative information for analysis. The dimension table may store the information on types of analysis in which the data in the fact table may be analysed. The cube values may indicate values corresponding to the dimensions in the data. In one embodiment, the user may specify/define the dimensions, measures, appropriate data sets for the data. The measures may be derived from the fact tables. The measures may be composed of measurements or information of a business process. Further, dimensions may be derived from the dimension tables. In other words, a measure value corresponds to a set of labels, where the description of the labels is described in the corresponding dimension. The cube definition may be captured in a form of an Extensible Markup Language (XML) file. The cube definition may also comprise metadata corresponding to the dimensions, the measures, and locations of the data sets on the HDFS 128. In one implementation, the cube definition may be stored in the repository/shared metastore 122.

Post storing the data in the repository/shared metastore 122, a series of mapreduce jobs may be launched on the data. Each mapreduce job may comprise a mapper and a reducer to execute the program instructions. The mapper may take a task, divide the task into sub-tasks and may distribute the task to the plurality of nodes in the dwarf cube builder 132. Each of the plurality of nodes may further divide the sub-tasks. Upon processing the task assigned to the plurality of nodes, the reducer may collect response to the tasks and provides an output. At first, the data may be given as an input to a first mapreduce job. Further, after the first mapreduce job, an output of the first mapreduce job may be given as an input to a second mapreduce job. Similarly, for subsequent mapreduce jobs, an output generated by the previous mapreduce job may be provided as the input for the subsequent mapreduce job. Specifically, during the first mapreduce job, the data may be transformed to a format. Steps involved in transforming the data to a format are explained in detail below.

In one embodiment, the series of mapreduce jobs described above may be launched by a driver (not shown). The driver may comprise the program instructions to invoke the mapreduce jobs. The driver may initialize the job and may be instructed by the dwarf cube builder 132 to execute the program instructions on a set of input files and to control where the output files are placed. The driver may identify the dataset based on the dimension being fact table or not i.e., single file or star schema. The driver may launch the mapreduce jobs for indexing the data. The driver may launch different levels of mapreduce jobs for processing the data comprising the cube values. In order words, the driver may determine an input location for the mapper with respect to the fact table of the data from which the data has to be read. The driver may comprise a logic for deciding number of mapreduce jobs required to execute, what/which data to be processed using a particular job, the datasets required to be indexed, location of the datasets from which the job has to be read. The driver may read the metadata in the form of the XML file and may designate the job to the mapreduce job. The driver may provide jobs (information) to the mapper to execute the program instructions.

Figure 4:
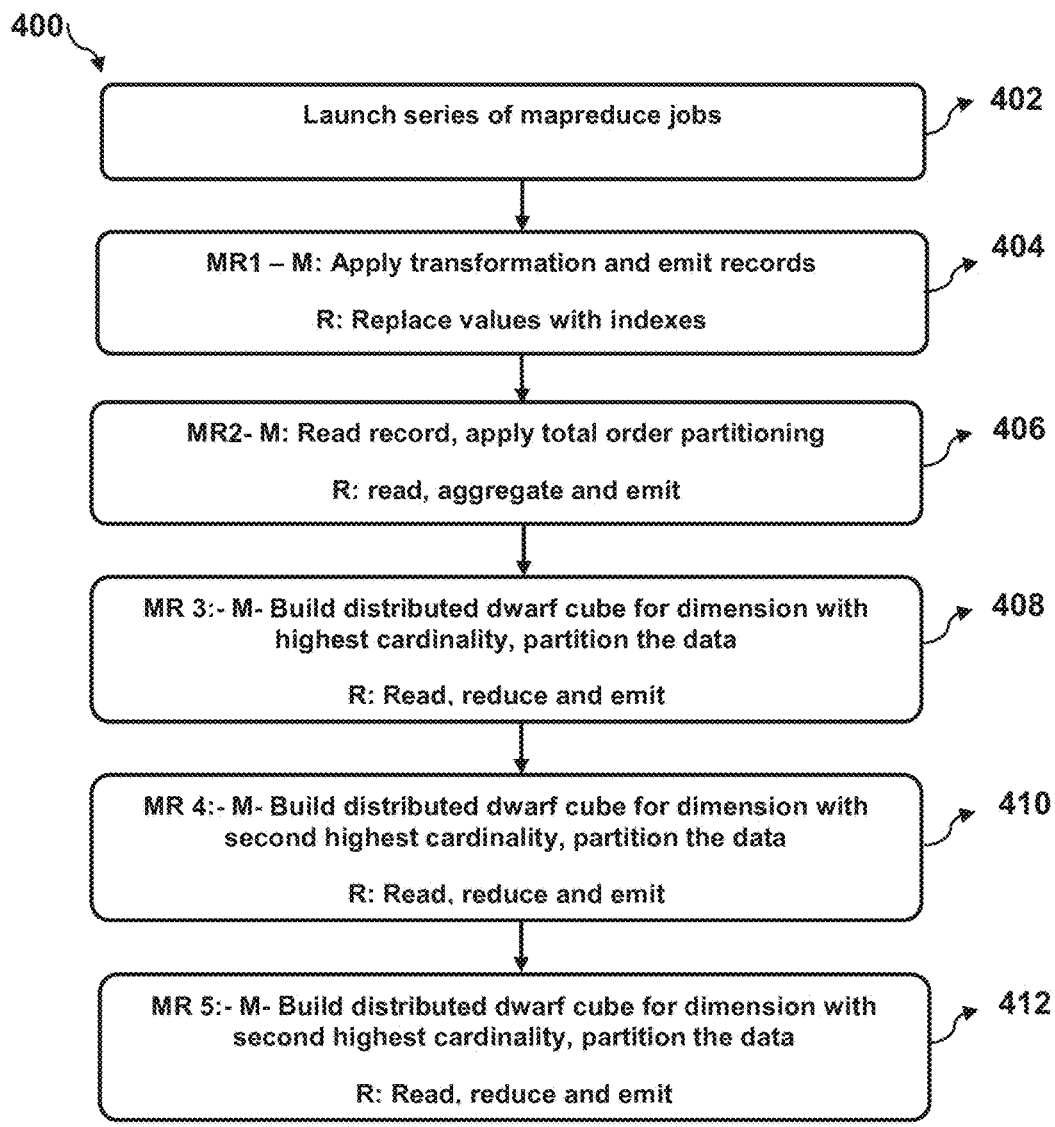
FIG. 4 illustrates a method for implementing a series of mapreduce jobs, in accordance with an embodiment of the present disclosure.

In order to understand execution of the series of mapreduce jobs by the dwarf cube builder 132, a flowchart shown in FIG. 4 may be used. At step 402, a first mapreduce job of the series of mapreduce jobs may be launched. In the first mapreduce job, a dimension of the data may be checked for a fact table or a single file/star schema. If the dimension of the data comprises the single file/star schema, the data for a given dimension may be processed first and then the data may be indexed. Specifically, at the first mapreduce job, the mapper may read the data from the specified location as may be defined in the cube definition. At step 404, based on the cube definition, the mapper may transform the data depending on operations to be performed on the data. In one example, the datasets may be transformed by adding custom fields to the data. The mapper may rationalize the data as may be defined during the transformation. The mapper may apply the transformations on the data and may emit the data to the reducer. After the mapper emitting the data at the first mapreduce job, for the star schema, the reducer at the first mapreduce job may replace the cube values with indexes. Further, for the dimensions in the single file that are not indexed at the time of processing, the reducer at the first mapreduce job may create/insert indexes. The indexing mapreduce job may be used for pre-building indexes for the star schema. In other words, using location of the data present in the XML file (cube definition), the data may be processed and indexes are generated for primary keys in sorted order for the cube values in the dimension. Specifically, the reducer at the first mapreduce job may create a tree-map for the cube values. The tree-map may be a disk based tree-map or B tree like data structure. The reducer at the first mapreduce job may create a set of tree-maps, one tree-map for each of the dimension that needs to be indexed. When the reducer receives the cube values, the reducer may insert the cube values into the tree-maps. Further, the cube values that are distinct may be collected from the tree-maps. The cube values that are distinct may be sorted for a given dimension. After completion of the first mapreduce job, the cube values that are distinct from each reducer may be collected at the driver and may be merged to create a single sorted map. The single sorted map may be used for generating indexes. The cube values may be replaced with the indexes for the dimensions.

However, if a dimension is of a fact table, the first mapreduce job may process the fact table and the data corresponding to the dimensions simultaneously and may create indexes for all the dimensions simultaneously.

In any case, whether the dimension is of a fact table or of a star schema, after inserting the indexes, the reducer at the first mapreduce job may emit the data with the cube values for each dimension and measures. The data processed by the reducer at the first mapreduce job may be stored on the HDFS 128. Further, at the end of first mapreduce job, the cube values corresponding to the dimension member might have been replaced with the indexes i.e., star schema. From the reducer of the first mapreduce job, a level of cardinality may be determined for the one or more dimensions. The cardinality indicates the number of distinctiveness of the cube values present in one or more dimensions. The dimensions may be arranged in the order of distinctiveness of the cube values. In other words, the dimensions may be arranged in the order of highest cardinality to lowest cardinality.

Upon processing of the data at the first mapreduce job, an output of the reducer at the first mapreduce job may be provided as an input to a mapper at a second mapreduce job. At the mapper of the second mapreduce job, the data may be arranged based on the cardinality of the cube values. The mapper of the second mapreduce job may emit the data. At step 406, the data that is emitted by the mapper of the second mapreduce job may be sorted. The cube values may be sorted in a decreasing order of cardinality, i.e., in an order of highest cardinality to lowest cardinality. In one implementation, the reducer at the second mapreduce job may sort the data based on the cardinality. The output of the second mapreduce job may be stored on the HDFS 128.

After sorting the data based on the cardinality at the second mapreduce job, a mapper at a third mapreduce job may be utilized to build the distributed dwarf cube. The output of the second mapreduce job may be split or partitioned into data blocks. Each data block may correspond to a/single distributed dwarf cube. At step 408, each data block may be processed by the mapper at the third mapreduce job. Before initiating third mapreduce job, the order of the dimension may be known. The mapper at the third mapreduce job may create/build the distributed dwarf cube using a dwarf algorithm. The dwarf algorithm may be used as presented in the U.S. Pat. No. 7,133,876, Titled Dwarf cube architecture for reducing storage sizes of multidimensional data and assigned to The University of Maryland College Park. After the mapper at the third mapreduce job maps the data, the distributed dwarf cube created may be stored on the HDFS 128. Upon storing the data on the HDFS 128, the dwarf cube builder 132 may maintain distribution of the distributed dwarf cube.

After building the distributed dwarf cube at the third mapreduce job, the dimensions with the highest cardinality may be eliminated. At the third mapreduce job, a mapper may emit remaining data after eliminating the dimensions with the highest cardinality. After emitting, the remaining data may be sorted for the dimension with second highest cardinality. In one implementation, a reducer at the third mapreduce job may sort the remaining data with the second highest cardinality. The remaining data sorted may be stored on the HDFS 128. Similarly, the distributed dwarf cube may be built with second highest cardinality at the fourth mapreduce job. After building the distributed dwarf cube for the dimension with the second highest cardinality by a mapper at the fourth mapreduce job, the data may be emitted with the second highest cardinality at step 410. After the data is emitted by the mapper, a reducer at the fourth mapreduce job may sort the further remaining data. Subsequently, the distributed dwarf cube may be built for the dimensions with the third highest cardinality at a fifth mapreduce job. At step 412, the fifth mapreduce job comprising a mapper may build the distributed dwarf cube and may emit the remaining data by eliminating the third highest cardinality. The data emitted by the mapper may be sorted by a reducer at the fifth mapreduce job. The data sorted may be stored on the HDFS 128. Similarly, the data may be processed for building distributed dwarf cubes for the dimensions until the data is reached to no dimension i.e., zero dimension cardinality. For each distributed dwarf cube that is built, the dwarf cube builder 132 may maintain/manage the metadata of the distributed dwarf cube.

Figure 5:
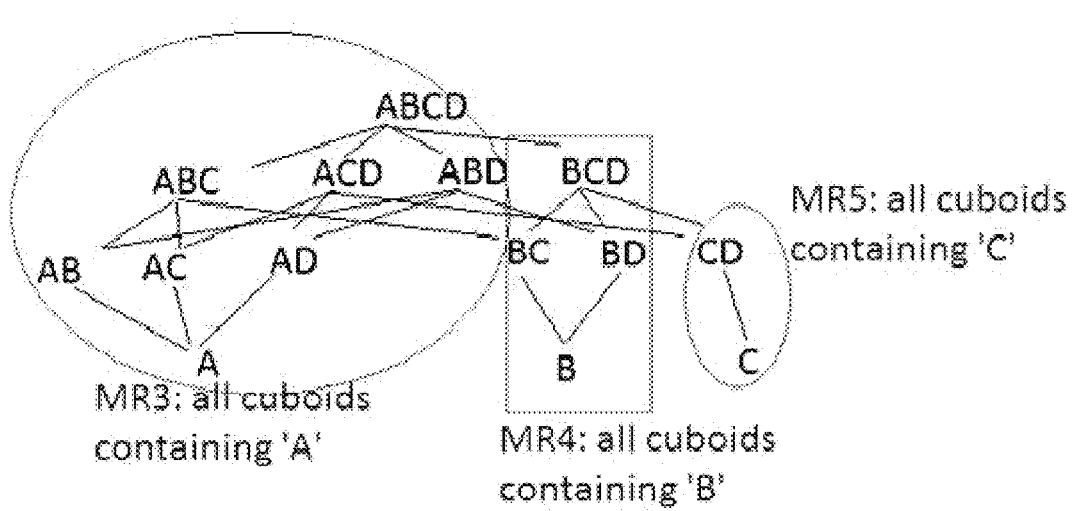
FIG. 5 illustrates building of the distributed dwarf cube, in accordance with an embodiment of the present disclosure.

In order to better understand the building of the cube/cuboid, FIG. 5 may be used as an example. Specifically, FIG. 5 shows the dimensions ABCD being arranged after the second mapreduce job. From the FIG. 5, it may be noted that the dimension A comprises highest cardinality followed by B, C, and D.

At the third mapreduce job (MR3), the mapper may create/build the distributed dwarf cube for the dimension ABCD and may emit the data comprising the dimension BCD. The mapper may partition the dimension B. The reducer at the third mapreduce job may read, reduce by aggregating the cube values and may emit the cube values.

At the fourth mapreduce job (MR4), the mapper may create/build the distributed dwarf cube for the dimension BCD and may emit the dimension CD. The mapper may partition the dimension C. The reducer at the fourth mapreduce job may reduce the data by aggregating and may emit the cube values.

At the fifth mapreduce job (MR5), the mapper may create/build the distributed dwarf cube for the dimension CD and may emit the dimension D. The mapper may partition the dimension D. The reducer at the fifth mapreduce job may reduce the data by aggregating and may emit the cube values.

At the sixth mapreduce job (MR6), the mapper may create/build the distributed dwarf cube for the dimension D and may not emit the cube values as there is no data is remaining to build the distributed dwarf cube. The reducer at the fifth mapreduce job may not run as there is no job is available.

As the distributed dwarf cube is built using the mapreduce jobs instead of having a single large consolidated distributed dwarf cube, the dwarf cube builder 132 may create multiple smaller distributed dwarf cubes. The dwarf cube builder 132 may build the distributed dwarf cube at map stage using the mapreduce technique such that the number of the distributed dwarf cubes created is equal to number of splits or data blocks. The mapreduce technique allows creating/building multiple splits of the data based on size and all the splits are processed in parallel. As the splits are processed in parallel, one mapper may be launched per split or the data block. Building of the distributed dwarf cubes at the map stage allows even distribution of the data blocks among various distributed dwarf cubes and may provide horizontal scaling. If the splits are created randomly using a hash partitioning as may be presented in the prior art, the query engine coordinator 136 may not have knowledge of what each dwarf cuboid of the distributed dwarf cube contains. Without the knowledge of the dwarf cuboid of the distributed dwarf cube comprising the data may result in querying each and every dwarf cuboid thereby increasing the time to retrieve the data based on the query. In order to have equal number of the distributed dwarf cubes for the splits or the data blocks, the data may be partitioned into the data blocks. By partitioning the data, a range comprising a start and an end values for each split may be determined. For the range determined, the user might be aware of each dwarf cuboid of the distributed dwarf cube comprising the data. When the user would like to search for the dwarf cuboid in the distributed dwarf cube, a binary search may be performed on the ranges determined and the dwarf cuboid may be located based on the query.

As presented above, the dwarf cube builder 132 may comprise the plurality of nodes or machines. One of the nodes in the plurality of nodes may act as a coordination master. The coordination master may comprise information related to which machine/node comprises the distributed dwarf cube, location of the distributed dwarf cube, the data that the distributed dwarf cube may corresponds/represents, the cube values defined in ranges that the distributed dwarf cube may be storing, etc. In a case when the coordination master does not function, one of the nodes remaining in the dwarf cube builder 132 may take over the responsibility of the coordination master. Further, the coordination master may ensure and maintain sanity of the metadata corresponding to the distributed dwarf cube. The dwarf cube builder 132 may create the metadata such as the node comprising the data in the distributed dwarf cube and store the metadata in the shared metastore 122. Further, the query engine coordinator 136 may read the metadata from the shared metastore 122. The metadata may be used at time of querying the cube values. In one example, Table 1 may be used as an example to illustrate the dwarf cube builder 132 maintaining the metadata and the query engine coordinator 136 may use the metadata at the time of querying. Consider the distributed dwarf cube comprising three dimensions, product, store and time. For example, product comprises BrandName (B)-ProductName (P) such as B1=P1-P50, B2=P51-P70, B3=P71-P80. The store may comprise StoreCountry, StoreState, StoreCity, and StoreName. The time may comprise Year, Quarter (Qtr) and Month. The dwarf cube builder 132 may maintain the metadata as shown in Table 1.

Table 1: Metadata Maintained by the Dwarf Cube Builder 132

TABLE 1

| DimName | startKey-endKey | cuboid UID |
| --- | --- | --- |
| Product | B1.P1-B1.P40 | cuboid#1 |
|  | B1.P41-B2.P60 | cuboid#2 |
|  | B2.P61-B3.P80 | cuboid#3 |
| Store | USA.CA.LosGatos.store1 | cuboid#4 |
| Time | 1997.Q1.Jan | cuboid#5 |

Each node in the dwarf cube builder 132 may send the metadata of the distributed dwarf cube to the coordination master. In one example, the metadata of the distributed dwarf cube may be sent to the coordination master via a Thrift remote procedure call (RPC). The thrift RPC may indicate a remote process that enables the dwarf cube builder 132 to call the program instructions. The program instructions may be called on a different node or another process on the same node of the dwarf cube builder 132. The thrift RPC may allow the dwarf cube builder 132 to define data types and service interfaces in a definition file. The thrift RPC may take the definition file as an input and generate program instructions to build RPC clients and servers that communicate seamlessly across programming languages. The Thrift RPC may allow transmitting of the data in a binary format among the plurality of nodes in the dwarf cube builder 132.

In one implementation, the coordination master may be responsible for distributing the distributed dwarf cube comprising the dwarf cuboids on the plurality of query engines 102. The coordination master may distribute the distributed dwarf cube by replicating the distributed dwarf cube on the plurality of query engines 102. The coordination master may maintain the information corresponding to the replication in the shared metastore 122. The coordination master may execute the replication by passing the information related to the replication to a cuboid distribution thread manager on the query engine 102. The cuboid distribution thread manager may comprise a plurality of threads. Each thread of the plurality of threads may comprise program instructions capable of or subject to synchronization with the plurality of the query engines 132. The plurality of threads may run in parallel, in sequence, or in combination. In one implementation, the coordination master may send a plurality of requests to replicate the dwarf cuboids. Based on the plurality of requests, the cuboid distribution thread manager may have a queue to hold the plurality of requests for replicating the distributed dwarf cube comprising the dwarf cuboids on the plurality of query engines 102. In one implementation, when the plurality of requests is received, the cuboid distribution thread manager may launch the plurality of threads to replicate the distributed dwarf cubes comprising the dwarf cuboids. In one example, the request for replicating the distributed dwarf cubes comprising the dwarf cuboids to different threads may run in parallel. When a request is received for replicating the dwarf cuboids on the query engine 102, the thread may copy the distributed dwarf cube from the HDFS 128 and may replicate the distributed dwarf cube on the query engine 102. In a case when a thread is free, the cuboid distribution thread manager may assign a new request for replication to the thread. Based on the new request, the thread may replicate the dwarf cuboid on the query engine 102. If the request is received for replicating two or more dwarf cubois, the coordination master may assign the request for the replication to different threads.

In order to replicate the distributed dwarf cubes comprising the dwarf cuboids on the plurality of query engines 102, each thread may select N query engines 132 on which the distributed dwarf cubes may be replicated. N may indicate a replication factor. For example, consider there are M query engines 132, where N<M. In one example, N out of M query engines 132 may be selected for the replication on the basis of health/status/state of the query engines 132. The thread may receive the information related to the health/state of the plurality of query engines 102 from the zookeeper 130. If N>=M, the replication may be performed on the plurality of query engines 102, i.e., M. Each of the thread may send the information related to replication for selecting the query engine 102. The information for replicating the dwarf cuboid on the query engine 102 may be sent through the Thrift RPC. The query engine 102, upon receiving the request for the replication may copy the dwarf cuboid from the HDFS 128 to a local disk (not shown) in the query engine 102.

When the request for replicating the distributed dwarf cube comprising the dwarf cuboids is received, the query engine 102 may send an acknowledgement of success or failure of the replication to the coordination master. After receiving the acknowledgement, the coordination master may update the shared metastore 122. The coordination master may update the shared metastore 122 that a given dwarf cuboid is stored in a particular query engine 102. In a case when the request for the replication fails, the coordination master may re-send the request for the replication. In one example, three attempts may be made for replication of the distributed dwarf cube to the query engine 102. After three attempts, if the replication fails, the coordination master may update the shared metastore 12 of the failure. The replication may fail because of several reasons including but not limited to failure of the query engine 102, non-availability of the query engine 102, etc. When the replication fails due to non-availability of the query engine 102, a new request may be made when a new query engine 102 arrives in the plurality of query engines 102 using the description provided above.

At any time of the distributed dwarf cube building and replicating the distributed dwarf cube on the plurality of query engines 102, the state/status of the plurality of nodes in the dwarf cube builder 132 may be maintained. Specifically, the state/status of the plurality of nodes in the dwarf cube builder 132 corresponding to the load the nodes experiencing may be maintained by the plurality of load balancers 134. The load that the dwarf cube builder 132 has may be distributed among the plurality of nodes in the plurality of dwarf cube builders 132. Similarly, the load that the dwarf cube builder 132 experience at the time of querying may be managed by the plurality of load balancers 134. The plurality of load balancers 134 may comprise nodes or machines that are part of the dwarf cube builder 132. In one embodiment, the plurality of load balancers 134 may comprise nodes that are not part of the dwarf cube builder 132. Based on the load at each of the node, the plurality of load balancers 134 may assign a particular task to the node. For example, consider the plurality of load balancers 1 . . . N responsible for distributing requests by the user across the dwarf cube builder 132. One of the nodes in the plurality of load balancers may act as a primary master that may be active and other nodes may act as secondary masters. The secondary masters may remain passive until the primary master perishes. When the node acting as the primary node perishes, one of the secondary masters may take the responsibility of the primary master.

After replicating the distributed dwarf cubes comprising the dwarf cuboids on the plurality of query engines 102, each query engine 102 may comprise a copy of the dwarf cuboid of the distributed dwarf cube on the local disk. In one implementation, the user may designate the number of copies of the dwarf cuboids to be stored on the query engine 102. Based on the number of copies stored on the query engine 102, the coordination master may maintain the metadata of the query engine 102. The metadata may comprise the number of copies that are stored in the query engine 102. In one implementation, the shared metastore 122 may be a Relational Database Management System (RDBMS) comprising a table determining the location of the query engine 102 and index number of the dwarf cuboid stored in the local disk. At the time of replicating the dwarf cuboids, if a query engine 102 breaks down, the coordination master may designate other query engine 102 to store/create the copy of the dwarf cuboid of the distributed dwarf cube on the local disk.

After replicating the dwarf cuboids of the distributed dwarf cube on the query engine 102, the dwarf cuboids may comprise one or more ranges defined for the cube values corresponding to a dimension. The one or more ranges may comprise complete cube values and non-complete cube values. The non-complete cube values indicate the cube values present at a start or an end of a range. For example, consider the dwarf cuboid comprises the cube values of the dimension e.g. product2. For the dimension product2, the cube values may be stored in the range e.g. 1(start)-3(end) in the distributed dwarf cube. For the distributed dwarf cube, when the cube values are at the boundary i.e., either at the start of the range i.e., 1 or at the end of the range i.e., 3, the cube values 1 and 3 may be called as the non-complete cube values. Further, the cube values comprising index of 2, the cube values may be called as the complete cube values.

In one example, categorization of the cube values as the complete cube values and the non-complete cube values may be explained. Consider the cube values in the distributed dwarf cube 3 are present in the range [t3]-[t5] and the indexes are stored as {t3, 0~*, p3}, {t4, 0~*, p2}, {t5, 0~*, p1}. At first, for the first index {t3, 0~*, p3}, as the cube values are present at the start of the range, the cube values are non-complete cube values. For {t4, 0~*, p2}, the cube values are complete cube values, this is because index of the cube value i.e., 4 does not match the start index 3 or the end index 5. Further, for {t5, 0~*, p1}, the cube values are non-complete cube values as the cube values are at the end of the range.

At the time of replicating the dwarf cuboids of the distributed dwarf cube, the status/state of the plurality of query engines 102 may be maintained. Specifically, the status/state of the plurality of query engines 102 may be maintained by the zookeeper 130. In one implementation, the query engines 132 may register themselves with the dwarf cube builder 132 and the registration may be maintained by the zookeeper 130. The zookeeper 130 may be used to update the runtime configuration changes of the plurality of nodes in the dwarf cube builder 132, the query engine 102 and the coordination master. Further, the zookeeper 130 may store information of the coordination master. In one embodiment, the zookeeper 130 may be used for electing a leader node in the dwarf cube builder 132. As presented earlier, if the coordination master breaks down, another node in the plurality of nodes may have to take the responsibility as the coordination master. When the coordination master breaks down, the zookeeper 130 may receive the information of the newly elected node that may act as the coordination master.

As presented above, after building the distributed dwarf cube, the dwarf cuboids of the distributed dwarf cube may be replicated on the plurality of the query engines 102. For the dwarf cuboids, when the user browses/queries/requests for the cube values, the query may be sent to the query engine coordinator 136. The query engine coordinator 136 may process the query based on a type of the query. In one example, the query may comprise request to show the cube values corresponding to a dimension. In another example, the query may comprise request to show the dimension comprising the cube values. In another example, the query may comprise request to show the cube values in a particular range of dimension values. Based on the type of the query, the query engine coordinator 136 may decide which of the dwarf cuboid of the distributed dwarf cube may be required to process the query. Based on the query, the query engine coordinator 136 may receive the metadata from the shared metastore 122. The metadata may comprise information of the dwarf cuboids of the distributed dwarf cubes that are distributed on the plurality of query engines 102. Further, the query engine coordinator 136 may receive the state/health of the plurality of query engines 102 from the zookeeper 130. Based on the metadata and the state/health of the plurality of query engines 102, the query engine coordinator 136 may decide to send the request to the plurality of query engines 102 to fetch/retrieve the cube values present in the dwarf cuboids of the distributed dwarf cube.

When the request is received at the plurality of query engines 102, the request may comprise details of the dwarf cuboids. Based on the details of the request, the query may be processed by the plurality of query engines 102. For example, consider that the details of the request comprise the dwarf cuboid one (1) comprising the data values corresponding to the query. The query engine 102 may read the dwarf cuboid one (1) and may send the data values to the query engine coordinator 136. The processing of the query at the query engine 102 is explained below.

When the query engine 102 receives the query, the query engine 102 may check for the complete cube values and non-complete cube values in the distributed dwarf cube. Based on the query, the cube values may be retrieved from the distributed dwarf. For example, consider a given dwarf cuboid comprises the cube values of the dimension e.g. product2. For the dimension product2, the cube values may be stored in the range of indexes e.g. 1(start)-3(end) in the dwarf cuboid. If the query engine 102 receives a query for the cube values in the index 2, the query engine 102 may read the cube values in the index 2.

After the query engine 102 reads the cube values, the query engine 102 may create a list of the cube values comprising the complete cube values and the non-complete cube values. For example, consider for a dimension, product2 the cube values are in the range of 2 to 10. For the example, the start and end of the range i.e., 2 and 10 may be defined. The cube values of 2 and 10 may be called as the non-complete cube values. Further, the cube values from 3 to 9 may be called as the complete cube values. If the query is received in the range of 3 to 9, the query engine 102 may create the list comprising complete cube values. After creating the list, the query engine 102 may sort the list alphabetically or by measure value i.e., 3, 4, 5 . . . in a sequential order. Similarly, if the query comprises the cube values i.e., 2 or 10, the query engine 102 may create the list of the non-complete cube values as 2 and 10 are the start and end of the range. Further, the query engine 102 may sort the non-complete cube values. In case of the non-complete cube values, the cube values may always be sorted alphabetically e.g. 2 and 10. The list comprising the complete cube values and/or the non-complete cube values may be transmitted to the query engine coordinator 136.

If the query engine 102 comprises multiple dwarf cuboids e.g. dwarf cuboid1 and dwarf cuboid2, the query engine coordinator 136 may request the query engine 102 to read both the dwarf cuboids of the distributed dwarf cubes when the query is received for the cube values present in the dwarf cuboid1 and the dwarf cuboid2. In order to read one or more dwarf cuboids, the query engine 102 may employ the plurality of threads. As presented above, the cuboid distribution thread manager may comprise the plurality of threads. Each thread may comprise program instructions capable of or subject to synchronization with the plurality of the query engines 132. When the query engine 102 receives the request, the cuboid distribution thread manager may launch the plurality of threads to read each of the dwarf cuboids of the distributed dwarf cube. For the above example, the query engine 102 may launch thread 1 and thread 2 for reading the dwarf cuboid1 and the dwarf cuboid2 respectively. Upon reading the cube values and completeness of the cube values, the query engine 102 may mark the cube values as the complete cube values or the non-complete cube values. In one implementation, the query engine 102 may not create the list of the cube values until the thread responds. The query engine 102 may wait for response from the cuboid distribution thread manager corresponding to each thread reading the cube values in the distributed dwarf cube. When the thread returns the cube values from the dwarf cuboid, the cuboid distribution thread manager may read the cube values from the thread and then the query engine 102 may create the list.

If the query engine 102 receives a query that requires the cube values stored in two or more dwarf cuboids of the distributed dwarf cubes, then the query engine 102 may read the two or more dwarf cuboids of the distributed dwarf cube. Similarly, if the two or more dwarf cuboids are storing the cube values in a range of 2-5 and 5-10, the query engine 102 may launch the threads via the cuboid distribution thread manager in a sequential order. Based on the query, the cuboid distribution thread manager receives the cube values from the dwarf cuboids. At the time of receiving the cube values from the two or more dwarf cuboids, the cuboid distribution thread manager may check completeness of the cube values. If the cube values are complete cube values, then the thread may add the cube values to the list of the complete cube values. Similarly, if the cube values are non-complete cube values, then the thread may store the cube values to merge with other non-complete cube values from the other dwarf cuboid. The cuboid distribution thread manager may store the non-complete cube values temporarily until all of the non-complete cube values are merged. The cuboid distribution thread manager may add the non-complete cube values for creating the list and may store the cube values temporarily. After merging the non-complete cube values, the cube values may be considered as the complete cube values. The merging of the non-complete cube values may be explained using an example. Consider the ranges 1-5 and 5-10 which are present in the dwarf cuboid1 and the dwarf cuboid 2. As discussed above, the cube value 5 is non-complete cube value. If the query is received for the cube value 5, the non-complete cube value 5 may be retrieved from both the dwarf cuboids and may be merged. When two non-complete cube values are merged, the cube value may be considered as the complete cube value as the cube value is not at the start or the end of the range corresponding to the query. After merging, the cube values may be sent to the query engine coordinator 136 by the query engine 102.

When the query engine 102 receives the query in ranges for the dimensions comprising a root dimension with a specific value for one or more non-root dimensions, the query engine 102 may have to read the nodes corresponding to root dimension and the non-root dimension in another node. In order to explain the query engine 102 serving the query in the ranges, consider a distributed dwarf cube with dimensions A, B, C, D and E. Consider, the dimension A is the root dimension and E is the leaf dimension. Consider the query engine 102 receives the query as (?, b1, c80, *, *). In order to process the query, the query engine 102 may have to read the node comprising dimension A where each cell of dimension A may point to a node comprising dimension B. Further, the query engine 102 may need to search the dimension B to find a cell comprising b1. If the query engine 102 finds the cell b1 in the node comprising B, then the query engine may read a node comprising dimension C. The node comprising the dimension B may point to the node comprising the dimension C and using the pointer the query engine 102 may find the cell c80. If the cell c80 is found by the query engine, it may be considered that the node comprising A has a valid value. If the cube value to be retrieved in the cell is at a bottom of the dimension A, the query engine 102 may have to read the dimensions of ABC in the dwarf cuboid structure. Searching in the entire dwarf cuboid may access multiple nodes e.g. thousand nodes from the local disk and may take considerable time to process the query.

Figure 7A:
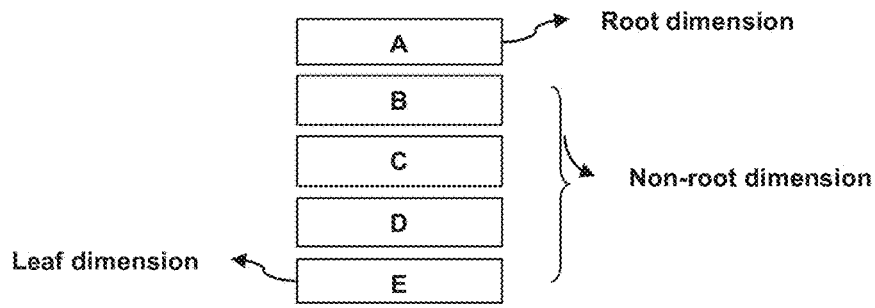
FIG. 7A illustrates root dimension and non-root dimensions arranged in an order, in accordance with an embodiment of the present disclosure.
Figure 7B:
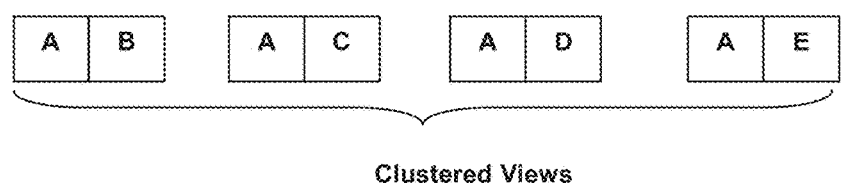
FIG. 7B illustrates views of the clustered root dimension and non-root dimensions, in accordance with an embodiment of the present disclosure
Figure 7C:
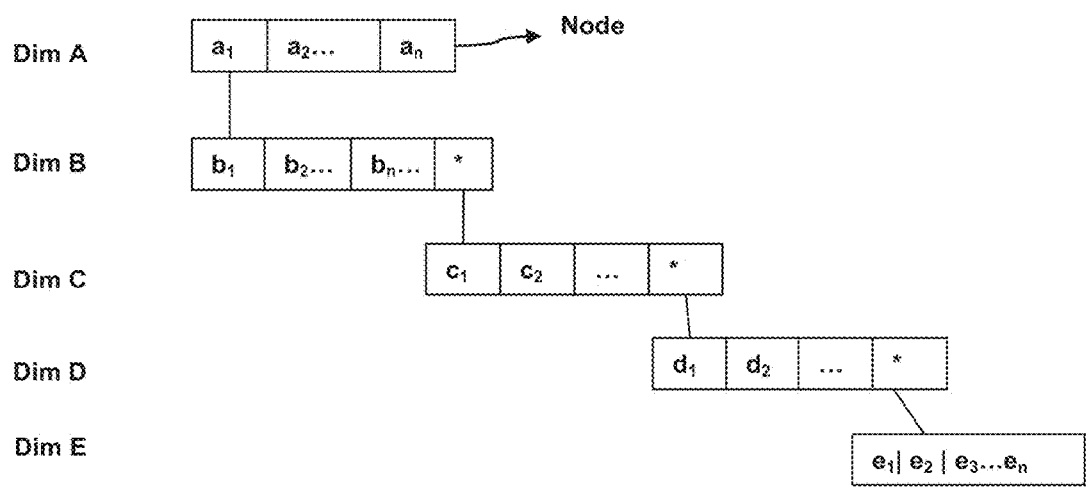
FIG. 7C illustrates nodes in a cluster pointing to other nodes in cluster views, in accordance with an embodiment of the present disclosure.

In order to process the query by searching the cells in the root dimension when the query engine 102 receives the query in ranges, views of the two or more dimensions may be clustered/combined to form clustered views. In the clustered views, a preliminary search may be performed to reduce searching in the cells of the root dimension. The views of the length e.g. 2 may be clustered where one dimension in each view is the root dimension and may comprise non-root dimension. The last dimension in the hierarchy may be considered as a leaf dimension. Considering the above example for the dimensions A, B, C, D and E, the views of the root dimensions and at least one non-root dimension may be clustered as shown in FIG. 7A. For the example, views AB, AC, AD and AE may be clustered. When the views are clustered/combined, the nodes corresponding to the views may be kept next to each other on the local disk as shown in FIG. 7B. For example, for the view AE may comprise (a1, a2, a3, a4, a5 . . . ) as values of A. In the views, a1 may point to the node comprising B and * of B may point to a node of C. Further * of node C may point to a node D and * of D. Further * of D may point to the node of E. The node pointing from A to E may be presented as <a1,*,*,*, E> or <a1E>. FIG. 7C may be used to illustrate the views pointing to leaf nodes comprising values of root dimension. Similarly, views a2E, a3E, a4E may be presented.

After clustering the views, a preliminary search may be performed in the clustered nodes of E to find a particular value of E. As views of AE are clustered, to find the value of E, it may be known that $i^{th}$ node for the cluster may be associated with $i^{th}$ value of A. In order to find the valid value of A for a given value of E, the preliminary search may be performed in the clustered node of E. In order to enhance performance of the preliminary search, the clustered nodes may be bought to in-memory of the query engine 102.

After clustering and bringing the clustered nodes in-memory of the query engine 102, the valid values of root dimension for any given value of the leaf dimension may be found. For the above example, (?, b1, c80,*,*), in order to process the query, a preliminary search may be performed in the views of AB and AC. From the preliminary search, an intersection of two sets may be obtained for the valid values. After performing the preliminary search, set#1 of valid values of A for B=b1, and set#2 of valid values of A for C=c80 may be obtained. The valid values set of A for B=b1&C=c80 may be obtained. After obtaining the intersection of the sets, the query may be searched within the values of A for B=b1&C=c80. By searching the values of A for B=b1&C=c80, the searching of entire cell in the node A may be avoided. Although the disclosure presents clustering two views, it may be understood that more than two views may be clustered and the preliminary search may be performed to identify the intersection. In one implementation, in case of dimensions are in hierarchical manner, the dimensions may be clustered and the views comprising primary levels i.e., top level of the hierarchy may be cached. For the primary levels comprising a root dimension and a parent dimension, the valid cells in the root dimension may be found and then the valid cells in the parent dimension may be found.

In one implementation, the querying the dwarf cuboid using a jump pointer technique is disclosed. In order to understand the jump pointer technique Table 2 may be used as an example. Specifically, Table 2 shows the data for the product P, Store, and time dimension in a retail store and values corresponding to the dimensions.

Table 2: Distributed Dwarf Cube Stored as the Indexes Comprising the Cube Values.

TABLE 2

| P1 | S1 | T1 | $10 |
| P1 | S2 | T2 | $10 |
| P2 | S1 | T1 | $20 |

Figure 6A:
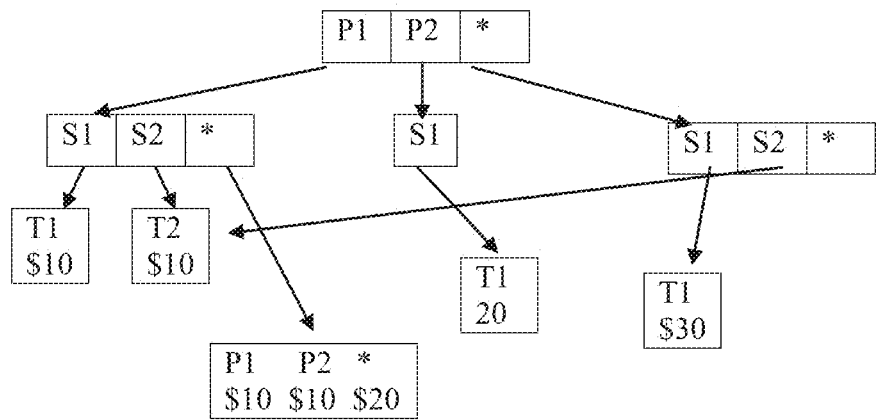
FIG. 6A illustrates a jump depth for a node, in accordance with an embodiment of the present disclosure.

In the dwarf cuboid of the distributed dwarf cube, each cell may point to a node that may be belonging to the dimension. For example, a cell pointing to the dimension may be called as a jump depth. It may be known that the jump depth for identifying a cell corresponding to the dimension is 1. In order to better understand the jump depth, Table 2 may be used as an example. For the Table 2, the jump depth may be presented as shown in FIG. 6A. From the FIG. 6A, it may be observed that the cell for the dimension of product corresponds to the cell of the dimension of the store. For example, to know the value of the Product 1 in Store 1 and Time 1, the pointer has to move through jump depth of 3. If the query has to processed, the query engine 102 may need to read all the dimensions in the jump depth.

Figure 6B:
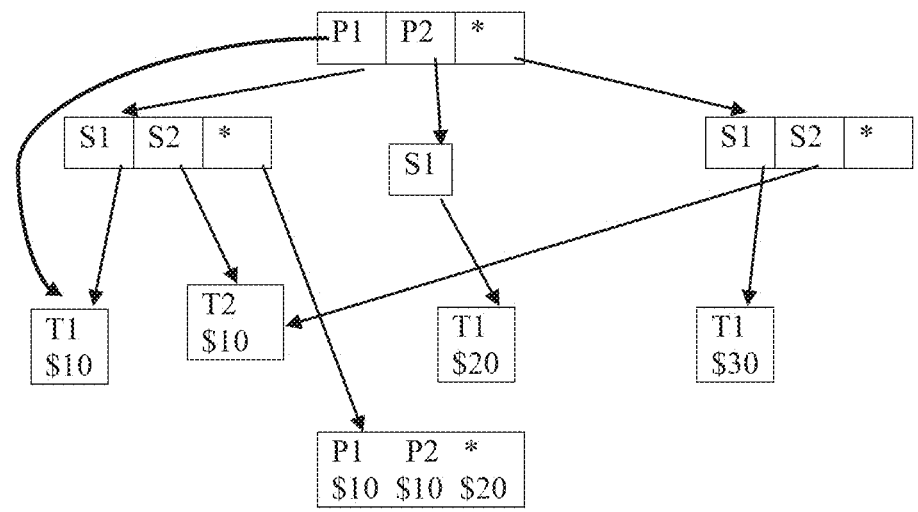
FIG. 6B illustrates introducing a new pointer in the jump depth for a node, in accordance with an embodiment of the present disclosure.

In order to overcome reading of all the dimensions nodes in the dwarf cuboid, the number of nodes that needs access may be made lesser than the number of the dimensions in the order. This may be achieved by introducing a new pointer in the cell. By introducing the new pointer, the number of nodes to be accessed may be reduced. The new pointer introduced may point to a node belonging to $j^{th}$ dimension. In other words, the $j^{th}$ dimension may indicate the jump depth of j. For example, if the jump depth is defined as 2, the pointer may jump two dimensions to retrieve the cube value from the node. In order to illustrate the new pointer, Table 2 may be used as an example. For the data in Table 2, consider that the jump depth is determined as 2 for the dimension, product P1. For the data shown in Table 2, the new pointer introduced in the cell may be illustrated in the FIG. 6B. When the query is processed by the query engine 102, the cube value for the product P1 may be retrieved from the cell in the dwarf cuboid as $10. Similarly, the jump depth may be defined with values such as 3, 4, and so on, for the dimensions to reduce the number of nodes accessed at the time of querying.

Figure 8:
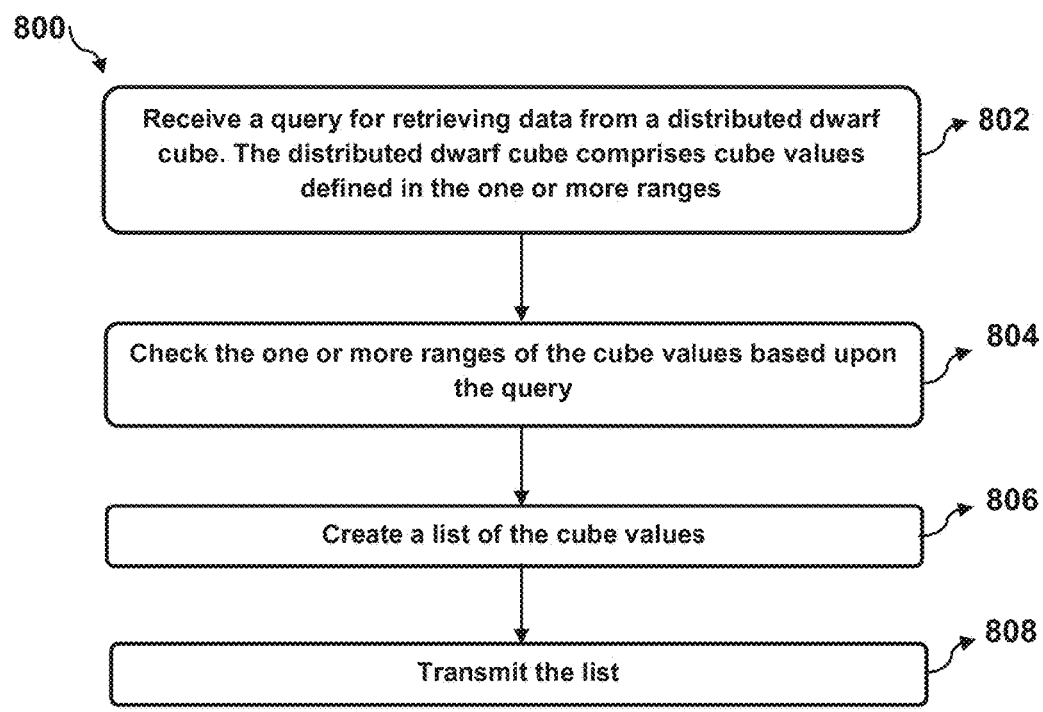
FIG. 8 illustrates a method for querying a distributed dwarf cube, in accordance with an embodiment of the present disclosure.

Referring now to FIG. 8, a method 800 for querying a dwarf cuboid of a distributed dwarf cube is shown, in accordance with an embodiment of the present disclosure. The method 800 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communications network. In a distributed computing environment, computer executable instructions may be located in both local and remote computer storage media, including memory storage devices.

The order in which the method 800 is described and is not intended to be construed as a limitation, and any number of the described method blocks can be combined in any order to implement the method 800 or alternate methods. Additionally, individual blocks may be deleted from the method 800 without departing from the spirit and scope of the disclosure described herein. Furthermore, the method may be implemented in any suitable hardware, software, firmware, or combination thereof. However, for ease of explanation, in the embodiments described below, the method 800 may be implemented in the above-described query engine 102.

At step/block 802, a query for retrieving data from a distributed dwarf cube may be received. The distributed dwarf cube is built of the data. The data comprises cube values. The distributed dwarf cube is built by processing the data to generate indexes for the data. After processing, the cube values in one or more dimensions may be sorted based on a cardinality of the cube values. The cube values are sorted in an order of highest cardinality to lowest cardinality. The cardinality indicates distinctiveness of the cube values in the one or more dimensions. After sorting, the data may be partitioning into data blocks to build distributed dwarf cube from each data block based upon the cardinality of the cube values. The distributed dwarf cube comprises one or more ranges defined for the cube values.

At step/block 804, the one or more ranges of the cube values may be checked based upon the query. The one or more ranges comprise complete cube values and non-complete cube values. The non-complete cube values indicate the cube values present at a start or an end of a range of the one or more ranges.

At step/block 806, for the cube values, a list of the cube values comprising the complete cube values and/or the non-complete cube values may be created.

At step/block 808, the list of the cube values may be transmitted from the distributed dwarf cube corresponding to the query.

Although implementations of system and method for querying a distributed dwarf cube have been described in language specific to structural features and/or methods, it is to be understood that the appended claims are not necessarily limited to the specific features or methods described. Rather, the specific features and methods are disclosed as examples of implementations for querying dwarf cubes.

The invention claimed is:

1. A method for querying a distributed dwarf cube comprising a plurality of dwarf cuboids, wherein the distributed dwarf cube is built using a mapreduce technique, the method comprising:
 receiving, by a processor, a query for retrieving data from a distributed dwarf cube, wherein the distributed dwarf cube is built of the data, wherein the data comprises cube values, wherein the distributed dwarf cube is built by:
  processing the data, at a first mapreduce job of a series of mapreduce jobs, to generate indexes for the data, wherein the indexes are generated for each dimension in the data, wherein the cube values are replaced with a corresponding index for each dimension of the data;
  sorting the cube values in one or more dimensions based on a cardinality of the cube values and index associated with each cube value, wherein the cube values are sorted in an order of highest cardinality to lowest cardinality at a second mapreduce job of the series of mapreduce jobs, wherein the cardinality indicates distinctiveness of the cube values in the one or more dimensions;
  partitioning the sorted data into data blocks based on a predefined size, wherein each data block is associated with a range, wherein the range corresponds to a start cube value and an end cube value of a highest cardinality dimension in the data block;
  building a distributed dwarf cube, comprising dwarf cuboids, at a third mapreduce job of the series of mapreduce jobs, wherein each dwarf cuboid is generated, from a data block, based on the range associated with the data block by:
   processing the data block using a dwarf algorithm;
   eliminating the dimensions with the highest cardinality from the data;
   processing the data recursively based on the series of mapreduce jobs till all the dimensions in the data block are eliminated; and
   storing the generated cuboid on a Distributed File System;
 querying, by the processor, the distributed dwarf cube, wherein a cluster of query engines is utilized for querying by:
  checking, by the processor, the one or more ranges of the cube values based upon the query, wherein the one or more ranges comprise complete cube values and non-complete cube values, wherein the non-complete cube values indicate the cube values present at a start or an end of a range of the one or more ranges;
  creating, by the processor, a list of the cube values comprising the complete cube values and/or the non-complete cube values; and
  transmitting, by the processor, the list of the cube values from the distributed dwarf cube corresponding to the query.

2. The method of claim 1, wherein the building further comprises replicating the distributed dwarf cube on a plurality of nodes.

3. The method of claim 2, wherein the distributed dwarf cube is queried on the plurality of nodes.

4. The method of claim 1, wherein the one or more dimensions are in a form of a star schema files or a single fact file.

5. The method of claim 4, wherein generation of the indexes, for the star schema, comprises replacing the cube values comprising primary keys with the indexes in a sorted order.

6. The method of claim 4, wherein the generation of the indexes, for the single fact file comprises:
 creating a tree map for the cube values, wherein the tree map comprises a disk based tree-map and a tree like data structure;
 collecting the cube values that are distinct in the tree map;
 sorting the cube values that are distinct for the dimension; and
 replacing the cube values with the indexes for the dimension.

7. The method of claim 1, wherein the querying further comprises:
 launching a series of threads; and
 retrieving the cube values using the series of threads from the distributed dwarf cube, the retrieving comprising:
  adding the cube values to the list when the cube values are complete cube values or merging the cube values to the list when the cube values are non-complete cube values.

8. The method of claim 1, the querying further comprises:
 receiving the query to retrieve multiple cube values from two or more dimensions;
 combining the two or more dimensions based on the query, wherein the two or more dimensions comprises at least one root dimension comprising one or more non-root dimensions;
 searching the two or more dimensions to identify an intersection of the cube values based on the combination; and
 retrieving the cube values based upon the searching.

9. A system for querying a distributed dwarf cube comprising a plurality of dwarf cuboids, wherein the distributed dwarf cube is built using a mapreduce technique, the system comprising:
 a processor;
 a memory coupled to the processor, wherein the processor executes program instructions stored in the memory, to:
  receive a query for retrieving data from a distributed dwarf cube, wherein the distributed dwarf cube is built of the data, wherein the data comprises cube values, wherein the distributed dwarf cube is built by:
   processing the data, at a first mapreduce job of a series of mapreduce jobs, to generate indexes for the data, wherein the indexes are generated for each dimension in the data, wherein the cube values are replaced with a corresponding index for each dimension of the data;

sorting the cube values in one or more dimensions based on a cardinality of the cube values and index associated with each cube value, wherein the cube values are sorted in an order of highest cardinality to lowest cardinality at a second mapreduce job of the series of mapreduce jobs, wherein the cardinality indicates distinctiveness of the cube values in the one or more dimensions;

partitioning the sorted data into data blocks based a predefined size, wherein each data block is associated with a range, wherein the range corresponds to a start cube value and an end cube value of a highest cardinality dimension in the data block;

building a distributed dwarf cube, comprising dwarf cuboids, at a third mapreduce job of the series of mapreduce jobs, wherein each dwarf cuboid is generated, from a data block, based on the range associated with the data block by:
processing the data block using a dwarf algorithm;
eliminating the dimensions with the highest cardinality from the data;
processing the data recursively based on the series of mapreduce jobs till all the dimensions in the data block are eliminated; and
storing the generated cuboid on a Distributed File System;

query the distributed dwarf cube, wherein a cluster of query engines is utilized to query the distributed dwarf cube to:
check the one or more ranges of the cube values based upon the query, wherein the one or more ranges comprise complete cube values and non-complete cube values, wherein the non-complete cube values indicate the cube values present at a start or an end of a range of the one or more ranges;
create a list of the cube values comprising the complete cube values and/or the non-complete cube values; and
transmit the list of the cube values from the distributed dwarf cube corresponding to the query.

10. The system of claim 9, building further comprises replicating the distributed dwarf cube on a plurality of nodes.

11. The system of claim 10, wherein the distributed dwarf cube is queried on the plurality of nodes.

12. The system of claim 9, wherein the one or more dimensions are in a form of a star schema files or a single fact file.

13. The system of claim 12, wherein generation of the indexes, for the star schema, comprises replacing the cube values comprising primary keys with the indexes in a sorted order.

14. The system of claim 12, wherein the generation of the indexes, for the single fact file comprises:
creating a tree map for the cube values, wherein the tree map comprises a disk based tree-map and a tree like data structure;
collecting the cube values that are distinct in the tree map;
sorting the cube values that are distinct for the dimension; and
replacing the cube values with the indexes for the dimension.

15. The system of claim 9, wherein the processor further executes the program instructions to:

launch a series of threads; and
retrieve the cube values using the series of threads from the distributed dwarf cube, the retrieving comprising:
adding the cube values to the list when the cube values are complete cube values or merging the cube values to the list when the cube values are non-complete cube values.

16. The system of claim 9, wherein the processor further executes the program instructions to:
receive the query to retrieve multiple cube values from two or more dimensions;
combine the two or more dimensions based on the query, wherein the two or more dimensions comprises at least one root dimension comprising one or more leaf dimensions;
search the two or more dimensions to identify an intersection of the cube values based on the combination; and
retrieve the cube values based upon the searching.

17. A non-transitory computer readable medium embodying a program executable in a computing device for querying a distributed dwarf cube comprising a plurality of dwarf cuboids, wherein the distributed dwarf cube is built using a mapreduce technique, the program comprising:
a program code for receiving a query for retrieving data from a distributed dwarf cube, wherein the distributed dwarf cube is built of the data, wherein the data comprises cube values, wherein the distributed dwarf cube is built by:
processing the data at a first mapreduce job of a series of mapreduce jobs, to generate indexes for the data, wherein the indexes are generated for each dimension in the data, wherein the cube values are replaced with a corresponding index for each dimension of the data;
sorting the cube values in one or more dimensions based on a cardinality of the cube values and index associated with each cube value, wherein the cube values are sorted in an order of highest cardinality to lowest cardinality at a second mapreduce job of the series of mapreduce jobs, wherein the cardinality indicates distinctiveness of the cube values in the one or more dimensions;
partitioning the sorted data into data blocks based on a predefined size, wherein each data block is associated with a range, wherein the range corresponds to a start cube value and an end cube value of a highest cardinality dimension in the data block;
building a distributed dwarf cube, comprising dwarf cuboids, at a third mapreduce job of the series of mapreduce jobs, wherein each dwarf cuboid is generated, from a data block, based on the range associated with the data block by:
processing the data block using a dwarf algorithm;
eliminating the dimensions with the highest cardinality from the data:
processing the data recursively based on the series of mapreduce jobs till all the dimensions in the data block are eliminated; and
storing the generated cuboid on a Distributed File System;
a program code for querying the distributed dwarf cube, wherein a cluster of query engines is utilized for querying by:
checking the one or more ranges of the cube values based upon the query, wherein the one or more ranges comprise complete cube values and non-complete cube values, wherein the non-complete cube values indicate the cube values present at a start or an end of a range of the one or more ranges;

creating a list of the cube values comprising the complete cube values and/or the non-complete cube values; and transmitting the list of the cube values from the distributed dwarf cube corresponding to the query.

\* \* \* \* \*